Feb. 17, 1925.
G. B. BOGART
TANK CAR GAUGE
Filed Dec. 20, 1921
1,526,659
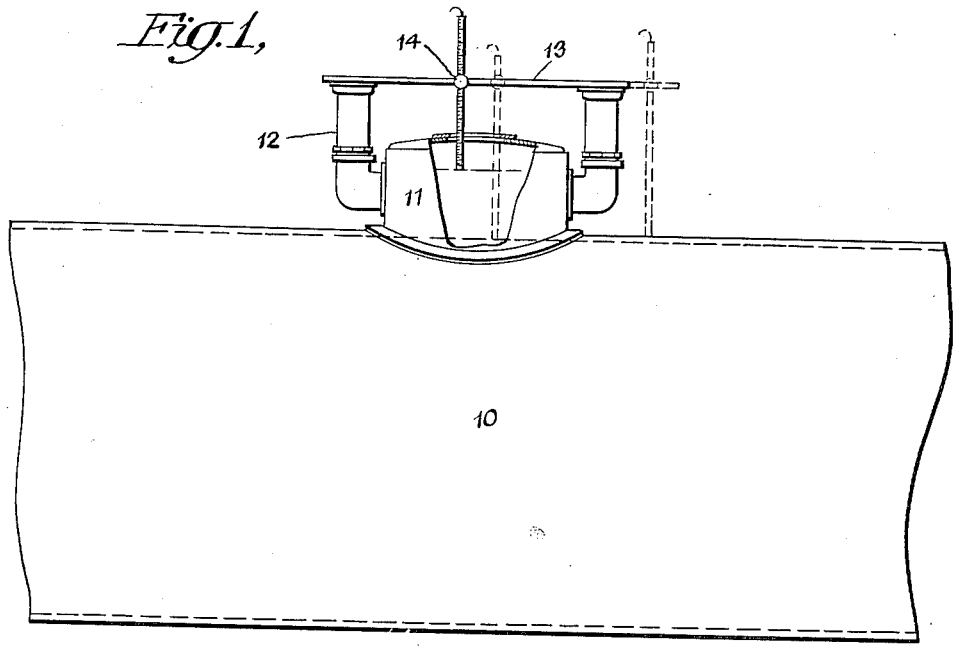
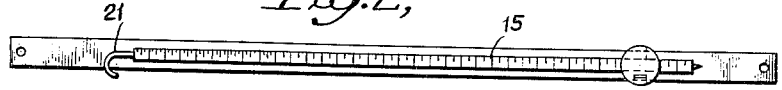
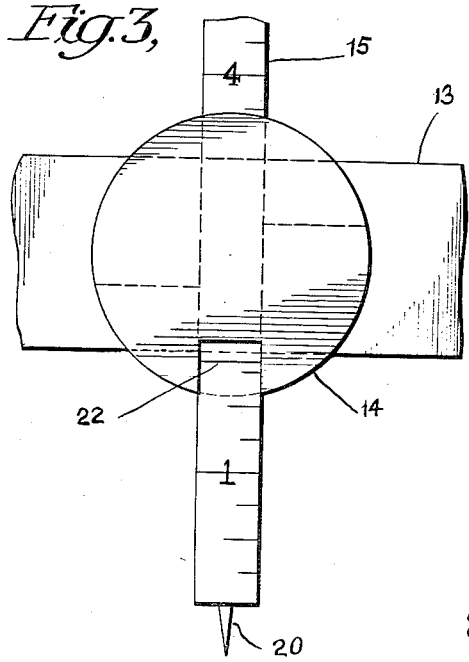
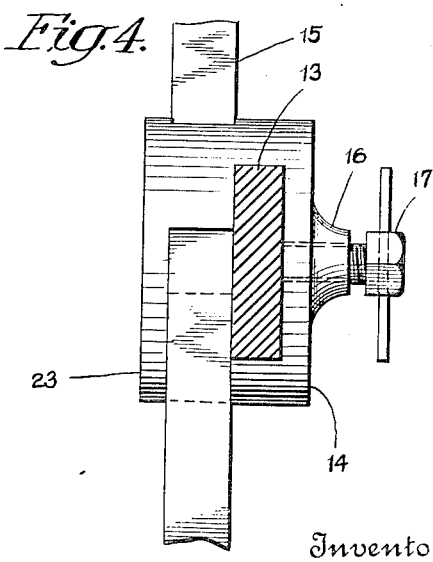
Inventor
Guy B. Bogart
By his Attorney Patented Feb. 17, 1925.

1,526,659

UNITED STATES PATENT OFFICE.

GUY B. BOGART, OF PORT ARTHUR, TEXAS, ASSIGNOR TO THE TEXAS COMPANY, OF NEW YORK, N. Y., A CORPORATION OF TEXAS.

TANK-CAR GAUGE.

Application filed December 20, 1921. Serial No. 523,688.

*To all whom it may concern:*

Be it known that I, GUY B. BOGART, a citizen of the United States of America, and a resident of Port Arthur, county of Jefferson, and State of Texas, have invented certain new and useful Improvements in Tank-Car Gauges, of which the following is a specification, reference being had to the accompanying drawing, forming a part thereof.

This invention relates to tank car gauges and more particularly to an apparatus for use with tank cars having domes for the control of the filling and emptying equipment.

In operation of such tank cars it is customary to fill the main tank of the car with material to be transported such as petroleum products and the like, and to transport the car over a railroad to a point of destination where the contents of the car are emptied out into suitable reservoirs or other apparatus. The dome of the tank car is sometimes filled with material as well as the main tank, and at other times the dome is left empty.

Upon receipt of the car at the destination it is desirable to measure the contents thereof prior to emptying of the car so that proper records may be made as to the quantity received. These records may then be compared with similar records made at the point of shipment to ascertain the amount of liquid put into the tank car at the point of shipment and to measure the amount of liquid received in the car at the destination.

Another object relates to the provision of means for measuring the contents of a tank car which may be employed in connection with a car having only its main tank full or partly full as well as with a tank car having its main tank and also its dome filled with liquid.

Another object relates to the provision of improved measuring means cooperating with parts of the tank car dome whereby the measuring means may be readily inserted into the car and measurements quickly and efficiently taken.

Still another object relates to the provision of a collapsible measuring means whereby the device when not in use may be folded into small compass and may be readily carried or stored away.

Other objects will appear from the following description of the invention taken in connection with the drawings, in which—

Fig. 1 shows a sectional elevation of so much of the tank car as is necessary to an understanding of the invention, Fig. 2 shows the measuring means in folded position, Fig. 3 shows a detail of the gauge stick and supporting member, and Fig. 4 is a side elevation of the clamping member.

Like reference characters denote like parts in the several figures of the drawings.

Referring to the drawings and more particularly to Fig. 1, one form of measuring means of the present invention is shown applied to a tank car 10 of conventional design and construction. The tank car is provided with a dome 11 in which is mounted the usual control handles for operating the valve mechanism of the car (not shown). The particular form of dome illustrated is provided with a pair of vent chambers such as 12 extending outwardly and upwardly from the dome 11 to form a hatchway for the escape of vapors should excessive pressures be set up at any time. The measuring apparatus comprises a supporting bar 13 formed of a substantially flat elongated metal plate, slidably mounted upon which is a connecting member 14 having a slot for the bar 13 and a second slot for the reception of a gauge stick 15. The member 14 is provided with a centrally positioned boss 16 into which is inserted a suitable set screw 17 for the purpose of clamping the bar 13 and the gauge 15 in a desired fixed relation. The gauge stick 15 and the bar 13 may thus be held at right angles to each other as shown in Figs. 1 and 3. The arrangement is such that the set screw may be released and the gauge stick 15 tilted in its slot so as to be brought through an angle of ninety degrees into parallelism with the bar 13, and thus the device may be compactly folded into the position shown in Fig. 2.

The supporting bar 13 is made long enough to span the spaced vents 12 and when supported upon these vents forms a support for the clamping member 14 by which the gauge stick 15 may be held in position for entering the opening of the dome 11. In cases where one or both of the vents 12 are omitted or where they do not extend above the opening of the dome the supporting bar 13 may be positioned upon the upper face of the dome 11 bridging the opening of the dome.

One or both faces of the gauge stick 14 are graduated in the manner similar to that shown in Fig. 3 the graduations being calibrated in any desired unit of measurement, whereby the contents of the car 10 or dome 11 may be computed. The end of the gauge stick 15 which is inserted into the dome and tank is preferably provided with a pin 20 for producing a readily discernible ripple on the surface of the liquid. The other end of the gauge stick 15 may be provided with a suitable hook 21 or other means for hanging up the device when not in use.

For providing a check line at which substantially accurate readings may be taken, a portion of the clamping member 14 opposite the path of movement of the gauge stick 15 is notched away and the inner surface of the notch is bevelled to provide a check line 22. The readings are taken by observing the graduation which is exposed immediately below the check line 22 in the notch described.

The use of the device in operation is obvious from the foregoing description taken in connection with the drawings. The amount of liquid within the car can readily be computed from the readings observed, and suitable tables or multiplier factor may be provided for converting the readings into desired units of measurements, as for example, into gallons.

Apparatus of preferred form and construction has been illustrated and described for the purpose of showing a way in which this invention may be practiced, but the inventive thought upon which this application is based is broader than this illustrative embodiment. It is therefore understood that the scope of the invention is not to be limited by the present disclosure, reference being had to the appended claims for that purpose.

What is claimed is:

Apparatus for measuring the contents of tank cars and the like comprising a connecting member having a horizontally disposed slot, a vertically disposed slot and a bevelled edge check line at one extremity of the vertically disposed slot, a normally horizontally disposed supporting bar extending through the horizontal slot of the connecting member, a graduated measuring gauge slidably mounted in the vertical slot and having the graduated face thereof discernible behind the check line of the connecting member, and means for securing the supporting bar and measuring gauge in fixed positions.

In witness whereof I have hereunto set my hand this 12th day of December, 1921.

GUY B. BOGART.